(12) United States Patent
Berlin

(10) Patent No.: US 7,216,189 B2
(45) Date of Patent: May 8, 2007

(54) SINGLE BIOS TECHNIQUE FOR SUPPORTING PROCESSORS WITH AND WITHOUT 64-BIT EXTENSIONS

(75) Inventor: Kimon Berlin, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 10/895,489

(22) Filed: Jul. 20, 2004

(65) Prior Publication Data
US 2006/0020730 A1    Jan. 26, 2006

(51) Int. Cl.
G06F 13/20 (2006.01)
G06F 13/24 (2006.01)
G06F 15/177 (2006.01)

(52) U.S. Cl. .................. 710/260; 710/104; 719/321

(58) Field of Classification Search ............... 710/260, 710/266, 104; 709/223, 216, 246, 300; 713/1, 713/2, 100; 719/321; 711/104
See application file for complete search history.

(56) References Cited

U.S. PATENT DOCUMENTS 6,122,732 A * 9/2000 Ahuja .................... 713/1
6,243,809 B1 * 6/2001 Gibbons et al. ............. 713/1
6,848,046 B2 * 1/2005 Zimmer .................... 713/100
2003/0093579 A1 * 5/2003 Zimmer et al. ............ 709/318
2005/0216577 A1 * 9/2005 Durham et al. ........... 709/223

OTHER PUBLICATIONS

"Pink: a 1024-node single-system image Linux cluster" by Warson et al. (abstract only) Publication Date: Jul. 20-22, 2004.*
"Achieving deterministic, hard real-time control on an IBM-compatible PC: a general configuration guideline" by Zhang et al. (abstract only) Publication Date: Oct. 10-12 2005.*

* cited by examiner

Primary Examiner—Gopal C. Ray
(74) Attorney, Agent, or Firm—Kevin M. Hart

(57) ABSTRACT

A technique according to the invention enables a single BIOS to support processors with or without 64-bit extensions efficiently. The BIOS creates a data structure having entries that correspond to elements stored in a state save area. The state save area elements themselves may be located at different addresses depending on whether or not the host processor includes 64-bit extensions. But the corresponding entries in the data structure are located at the same offsets within the data structure in either case. During execution of an SMI handler routine, the BIOS accesses the data structure whenever it needs to access elements of the state save area.

14 Claims, 3 Drawing Sheets

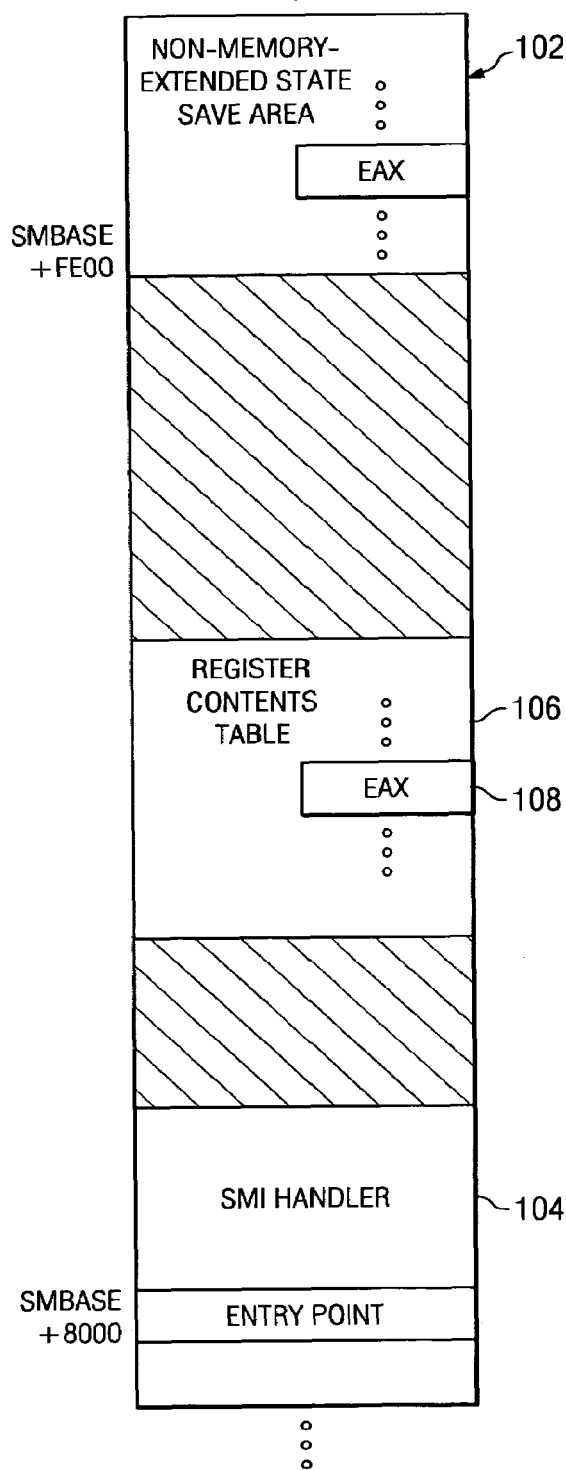
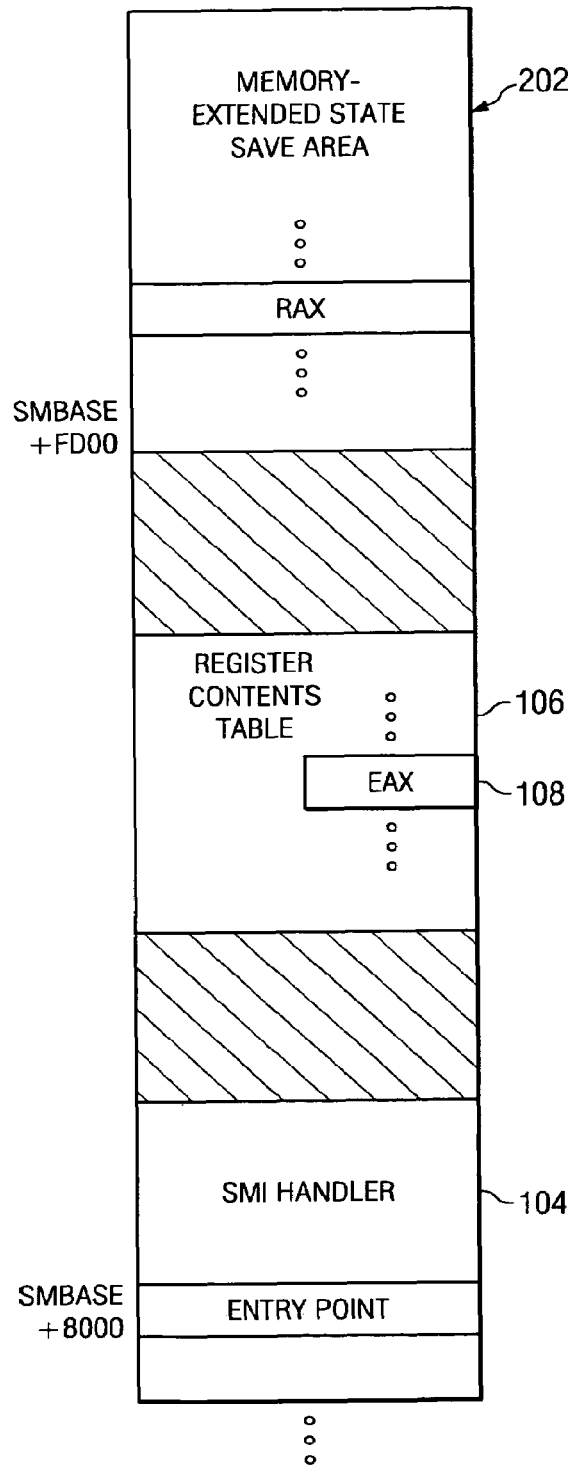

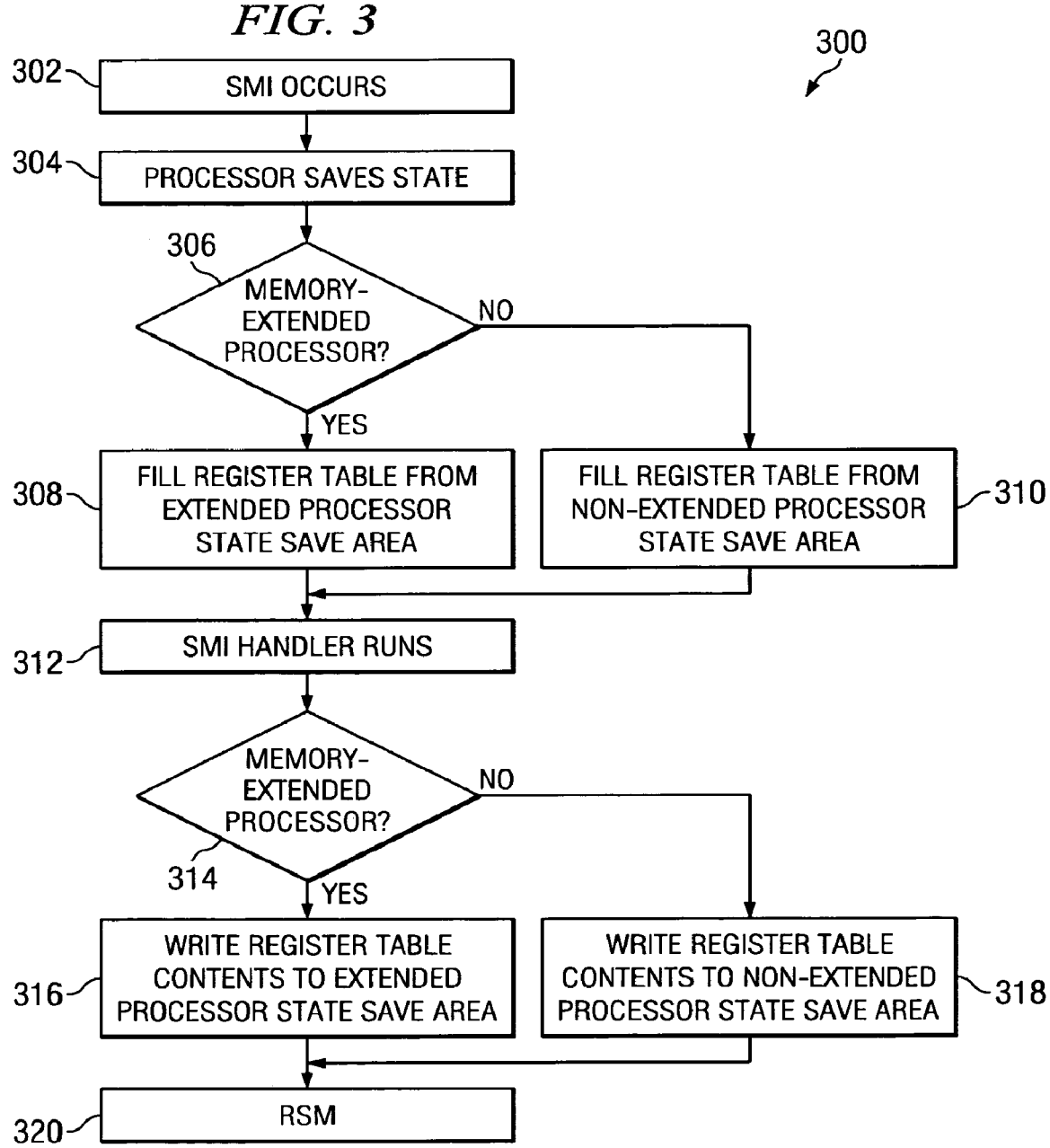

SINGLE BIOS TECHNIQUE FOR SUPPORTING PROCESSORS WITH AND WITHOUT 64-BIT EXTENSIONS

FIELD OF THE INVENTION

This invention relates generally to computer system software. More particularly, the invention relates to basic input-output services ("BIOS") software or firmware for supporting Intel Corporation ("Intel") processors.

BACKGROUND

System management mode ("SMM") is a special-purpose operating mode available on Intel's IA-32 processors. Its purpose is to provide an alternate operating environment that can be used by firmware to execute proprietary OEM code or to handle system-wide functions like power management or system hardware control. The main benefit of SMM is that it offers an isolated environment so that these types of functions may be performed in a manner that is transparent to the operating system and application software.

SMM may be invoked only by a system management interrupt ("SMI") presented either at the SMI# pin of the processor or via an SMI message on the processor's advanced programmable interrupt controller ("APIC") bus. When an SMI occurs, the processor exits its current operating mode to enter SMM mode and then returns to the previous operating mode upon execution of a resume ("RSM") instruction. Upon entry into SMM, the processor writes its register contents or "state" to a state save area within a segment of memory known as system management RAM ("SMRAM"). Upon returning from SMM, the processor restores its register contents according to information found in the state save area.

An internal SMBASE register is provided in the processor to store the base address of the SMRAM. Thus, SMI interrupt handler code may be stored at SMBASE+8000h in SMRAM, for example, while the state save area may be located at SMBASE+FE00h. While the absolute location of SMRAM may be modified by modifying the value in the SMBASE register, specific offsets within the state save area corresponding to particular register contents depend on the particular processor model and family. In general, they are fixed by Intel and are published by Intel in its IA-32 architecture software developer's manuals. For example, for one Intel processor, CR0 contents are stored at SMBASE+FFFCh in the state save area, EFLAGS contents are stored at SMBASE+FFF4h, and so on.

Some of the more recent IA-32 processors offer Intel's "extended memory 64 technology." An IA-32 processor that is equipped with extended memory 64 technology (hereinafter "a memory-extended processor") is capable of running a 64 bit operating system and accessing a 64-bit address space. In addition, such a memory-extended processor's general-purpose registers and instruction pointers are 64-bits wide. While extended memory 64 technology represents progress for the IA-32 architecture, one aspect of extended memory 64 technology is that the map of the state save area to be used during SMM has been changed relative to the map that existed for non-memory-extended IA-32 processors. For example, the offsets for saving the state of particular registers in the state save area have been changed to account for the fact that the registers to be saved are now 64 bits in length rather than 32 bits in length. In addition, memory-extended processors have been equipped with additional registers that non-memory-extended processors did not have.

As a consequence of these changes to the state save area memory map, BIOS firmware designed for non-memory-extended processors will not function properly in memory-extended platforms, and BIOS firmware designed for memory-extended processors will not function properly in non-memory extended platforms. To date, the solution to this problem for PC and workstation manufacturers has been to make at least two different versions of BIOS firmware available so that one version may be installed in non-memory-extended platforms and the other version may be installed in memory-extended platforms. Unfortunately, this solution increases cost because it requires that at least two different versions of the BIOS be maintained and supported.

SUMMARY OF THE INVENTION

A technique according to the invention enables a single BIOS to support processors with or without 64-bit extensions efficiently.

In general, a BIOS according to the invention creates a data structure having entries that correspond to elements stored in a state save area. The state save area elements themselves may be located at different addresses depending on whether or not the host processor includes 64-bit extensions. But the corresponding entries in the data structure are located at the same offsets within the data structure in either case. During execution of an SMI handler routine, the BIOS accesses the data structure whenever it needs to access elements of the state save area.

According to a first preferred embodiment, the data structure is a register contents table. The BIOS copies memory contents from the state save area to the register contents table upon entering SMM. Addresses of elements in the state save area may differ depending on whether or not the host processor is memory extended. But offsets of the entries in the register contents table are the same regardless of whether or not the host processor is memory extended. When executing SMI handling routines while in SMM, the BIOS accesses the register contents table in lieu of the state save area whenever it needs to read from or write to register values that normally would be found in the state save area. Prior to exiting SMM, the BIOS copies contents from the register contents table back to the state save area.

According to a second preferred embodiment, the data structure is a register address table. The BIOS may create the register address table during a boot procedure. Depending on whether or not the host processor is memory extended, the register address table contains either those addresses that correspond to a memory-extended state save area or those addresses that correspond to a non-memory-extended state save area. In either case, offsets into the register address table are the same for the contents of any given register. Whenever the BIOS executes an SMI handler routine, the SMI handler resolves addresses for saved register contents via the register address table before accessing those contents in the state save area.

A BIOS implemented according to the invention provides a number of advantages over those of the prior art. First, it enables a single BIOS to support host processors with or without 64-bit extensions. This results in cost savings because it eliminates the need for manufacturers to maintain and support two different BIOS images. Second, it eliminates the need for BIOS code to determine whether or not the processor is memory-extended each time it requires access to saved register contents while in SMM. This results in a dramatic simplification of SMI handler code, which in turn makes the BIOS easier to debug and maintain.

BRIEF DESCRIPTION OF THE DRAWINGS

FIG. 1 is a block diagram illustrating memory structures of a computer configured according to a first preferred embodiment of the invention wherein the computer does not include a memory-extended processor.

FIG. 2 is a block diagram illustrating memory structures of a computer configured according to the first preferred embodiment of the invention wherein the computer includes a memory-extended processor.

FIG. 3 is a flow diagram illustrating preferred computer program code for utilizing the memory structures of FIGS. 1 and 2.

DETAILED DESCRIPTION OF THE PREFERRED EMBODIMENTS

Figure 4:
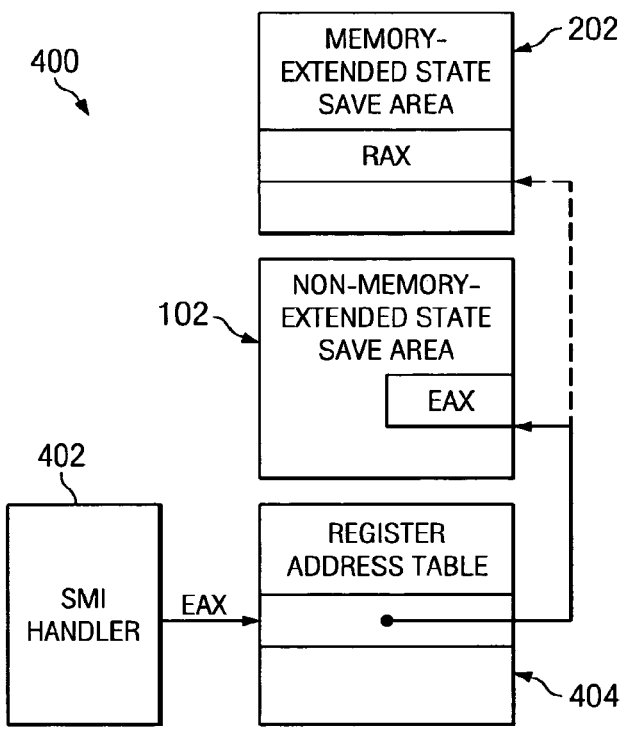
FIG. 4 is a block diagram illustrating memory structures of a computer configured according to a second preferred embodiment of the invention.

FIGS. 1 and 2 illustrate exemplary SMRAM memory maps according to a first preferred embodiment of the invention. Memory map 100 corresponds to a computer having a non-memory-extended processor. Memory map 200 corresponds to a computer having a memory-extended processor. State save areas 102, 202 are for the purpose of storing the state of a host processor while it is in SMM. These state save areas should be located at Intel-prescribed offsets from SMBASE so that the host processor may correctly store and retrieve its state information upon entering and exiting SMM, respectively. In the case of the non-memory-extended processor, state save area 102 contains 32-bit register contents. (A location for the contents of the EAX register is shown by way of example.) In the case of the memory-extended processor, state save area 202 is larger than state save area 102 and contains 64-bit register contents. (A location for the contents of the RAX register is shown by way of example. The low-order 32-bits of the RAX register correspond to the contents of the EAX register, but the offsets of the EAX and RAX register contents within state save areas 102 and 202 may differ.)

SMI handler code 104 may be the same regardless of whether or not the host processor is memory-extended. It may be located anywhere in memory so long as its first instruction is stored at an Intel-prescribed location so that the host processor may successfully find a proper starting point upon entering SMM. The SMI handler code is for the purpose of implementing a variety of SMI utility functions exported by the BIOS firmware. In addition to implementing those functions, it may also implement method 300 to be described below in relation to FIG. 3.

Data structure 106 is a register contents table. Like the SMI handler code, it may be the same regardless of whether or not the host processor is memory extended. It may be located anywhere in SMRAM. Its purpose is to contain a copy of all or a portion of the contents of state save area 102/202 during the handling of an SMI. In a preferred embodiment, SMI handler code 104 may be written so that it uses only 32bit register values and 32-bit addresses. In this manner, the same SMI handler code may be used on both memory-extended and non-memory-extended platforms. Thus, in memory map 100, register contents table 106 may contain, for example, a copy of the entire contents of the EAX register at offset 108 from the beginning of the table. In memory map 200, the location at offset 108 in register contents table 106 would contain just the low-order 32-bits of the RAX register. The specific registers shown in the drawings (RAX and EAX) are shown by way of illustration only. In actual embodiments of the invention, registers other than those shown in the drawings may be chosen for copying into register contents table 106 as appropriate.

FIG. 3 illustrates a preferred method for utilizing the memory structures of FIGS. 1 and 2. Whenever an SMI occurs (step 300), the host processor will save its register contents into its state save area in step 302. Next, the BIOS determines in step 306 whether or not the host processor is memory-extended. It may do so in a variety of ways. For example, it may check the "extended feature" flag after executing a CPUID instruction. Alternatively, it may check the SMM revision ID number stored in state save area 102/202. (This revision ID number is stored at an Intel-specified offset within the state save area. The offset is the same regardless of whether or not the host processor is memory extended.) After the determination of step 306 has been made, the BIOS copies all or a portion of the contents of state save area 102/202 into register contents table 106. If step 306 indicated that the host processor was memory extended, then the BIOS will use the addresses of state save area 202 to perform this function (step 308) and will copy only the low-order 32 bits of whichever register contents are chosen for copying. But if step 306 indicated that the host processor was not memory extended, then the BIOS will use the addresses of state save area 102 to perform this function (step 310) and will copy the entire 32 bits of whichever register contents are chosen for copying.

In step 312, SMI handler 104 performs whichever function was requested by the SMI. In doing so, the SMI handler may have a need to read from or write to saved register content elements normally found in state save area 102/202. But if so, in the method of FIG. 3, the SMI handler does not access that information directly in the state save area. Instead, the SMI handler reads from or writes to corresponding entries within register contents table 106 in lieu of those in the state save area. After the SMI handler has performed the requested function, and upon exiting SMM, BIOS behavior once again depends on whether or not the host processor is memory extended (step 314). If the host processor is memory extended, then the BIOS will copy contents from register table 106 back into state save area 202. If the host processor is not memory extended, then the BIOS will copy contents from register table 106 back into state save area 102. Finally, the processor exits SMM upon executing a RSM instruction in step 320.

FIG. 4 is a memory diagram illustrating SMRAM according to a second preferred embodiment of the invention. In the diagram of FIG. 4, state save areas 102/202 are the same as those in the diagrams of FIGS. 1 and 2. But instead of a register contents table 106, the embodiment of FIG. 4 uses a register address table 404. Register address table 404 may be located anywhere in SMRAM. SMI handler 402 may be the same as SMI handler 104 except that the BIOS differs from that of FIG. 3 regarding initialization and utilization of register address table 404. SMI handler 402 may be located anywhere in memory (provided the host processor can find the first instruction), and may be the same regardless of whether or not the host processor is memory extended.

Figure 5:
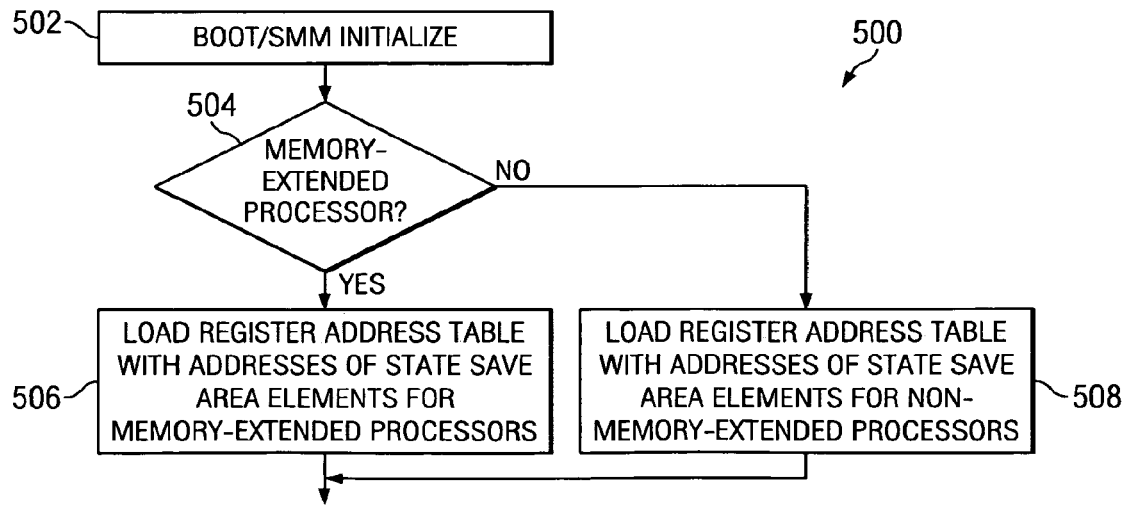
FIG. 5 is a flow diagram illustrating preferred computer program code for initializing the memory structures of FIG. 4.

FIG. 5 illustrates a preferred method 500 for initializing the memory structures of FIG. 4. Method 500 may be performed when the host computer is booted, during an SMM initialization procedure (step 502), or at any other suitable time. In step 504, the BIOS determines whether or not the host processor is memory extended. It may do so using any of the above-described techniques. If the host processor is memory extended, then the BIOS loads register address table 404 with addresses of all or a portion of the elements in state save area 202. But if the host processor is not memory extended, then the BIOS loads register address table 404 with address of all or a portion of the elements in state save area 102. In either case, the entries of table 404 are stored at the same offsets within the table. The embodiment of FIG. 4 is to be distinguished from that of FIGS. 1 and 2 in the following sense: table 404 stores the addresses of elements in the state save area, not their contents, while table 106 stores the contents of elements in the state save area, not their addresses.

Figure 6:
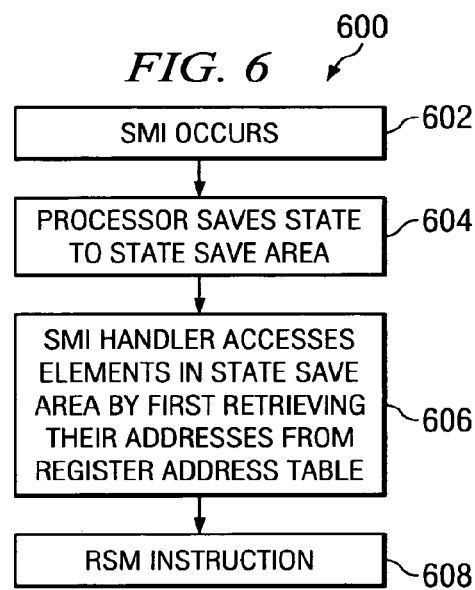
FIG. 6 is a flow diagram illustrating preferred computer program code for utilizing the memory structures of FIG. 4.

FIG. 6 illustrates a preferred method 600 for utilizing the memory structures of FIG. 4. Whenever an SMI occurs (step 602), the host processor will save its register contents into its state save area in step 604. In step 606, SMI handler 402 performs whichever function was requested by the SMI. In doing so, the SMI handler may have a need to read from or write to a saved register content element normally found in state save area 102/202. But if so, in the method of FIG. 6, the SMI handler accesses that element by first looking up the element's address from table 404 and then accessing the element in the state save area using the looked-up address. Because the entries in table 404 are stored at the same offsets in table 404 regardless of whether or not the host processor is memory extended, the same code for SMI handler 404 handles either case correctly and efficiently. Finally, the processor exits SMM upon executing a RSM instruction in step 608.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A method for supporting processors with or without 64-bit extensions using a single BIOS, comprising:
    creating a data structure having entries that correspond to elements in a state save area of SMRAM, some or all of the elements in the state save area being located at different addresses depending on whether or not a host processor includes 64-bit extensions, but all of the entries in the data structure being located at the same offsets within the data structure in either case, wherein the data structure comprises a data contents table;
    copying, upon entering SMM, memory contents from the state save area into the register contents table;
    during execution of an SMI handler routine, accessing one of the entries in the data structure when it is necessary to access contents of a corresponding one of the elements in the state save area; and
    prior to exiting SMM, copying memory contents from the register contents table into the state save area.

2. The method of claim 1, wherein:
    the particular elements of the state save area represented by the entries of the data structure constitute a proper subset of the total elements of the state save area.

3. The method of claim 1, wherein:
    during execution of a requested SMI function, the SMI handler routine accesses an entry in the register contents table in lieu of that entry's corresponding element in the state save area.

4. The method of claim 1, wherein:
    each entry in the register contents table contains only the low-order 32 bits of the corresponding element of the state save area.

5. A storage medium containing program code that, when executed on a computer, causes the computer to perform a method for supporting processors with or without 64-bit extensions using a single BIOS, the method comprising:
    creating a data structure having entries that correspond to elements in a state save area of SMRAM, some or all of the elements in the state save area being located at different addresses depending on whether or not a host processor includes 64-bit extensions, but all of the entries in the data structure being located at the same offsets within the data structure in either case, wherein the data structure comprises a data contents table;
    copying, upon entering SMM, memory contents from the state save area into the register contents table;
    during execution of an SMI handler routine, accessing one of the entries in the data structure when it is necessary to access contents of a corresponding one of the elements in the state save area; and
    prior to exiting SMM, copying memory contents from the register contents table into the state save area.

6. The storage medium of claim 5, wherein:
    the particular elements of the state save area represented by the entries of the data structure constitute a proper subset of the total elements of the state save area.

7. The storage medium claim 5, wherein:
    during execution of a requested SMI function, the SMI handler routine accesses an entry in the register contents table in lieu of that entry's corresponding element in the state save area.

8. The storage medium of claim 5, wherein:
    each entry in the register contents table contains only the low-order 32 bits of the corresponding element of the state save area.

9. A method for supporting processors wit or without 64-bit extensions using a single BIOS, comprising:
    creating a data structure having entries that correspond to elements in a state save area of SMRAM, some or all of the elements in the state save area being located at different addresses depending on whether or not a host processor includes 64-bit extensions, but all of the entries in the data structure being located at the same offsets within the data structure in either case; and
    during execution of an SMI handler routine, accessing one of the entries in the data structure when it is necessary to access contents of a corresponding one of the elements in the state save area;
    wherein the data structure comprises a register address table and the SMI handler routine accesses an element in the state save area by first retrieving that element's address from the register address table.

10. The method of claim 9, wherein:
    the particular elements of the state save area represented by the entries of the data structure constitute a proper subset of the total elements of the state save area.

11. The method of claim 9, wherein:
creating the data structure occurs during a boot procedure.

12. A storage medium containing program code that, when executed on a computer, causes the computer to perform a method for supporting processors with or without 64-bit extensions using a single BIOS, the method comprising:
creating a data structure having entries tat correspond to elements in a state save area of SMRAM, some or all of the elements in the state save area being located at different addresses depending on whether or not a host processor includes 64-bit extensions, but all of the entries in the data structure being located at the same offsets within the data structure in either case; and
during execution of an SMI handler routine, accessing one of the entries in the data structure when it is necessary to access contents of a corresponding one of the elements in the state save area;
wherein the data structure comprises a register address table and the SMI handler routine accesses an element in the state save area by first retrieving that element's address from the register address table.

13. The storage medium of claim 12, wherein:
the particular elements of the state save area represented by the entries of the data structure constitute a proper subset of the total elements of the state save area.

14. The storage medium of claim 12, wherein:
creating the data structure occurs during a boot procedure.

* * * * *